US007707827B2

(12) United States Patent
Nosaka et al.

(10) Patent No.: US 7,707,827 B2
(45) Date of Patent: May 4, 2010

(54) EXHAUST GAS PURIFYING APPARATUS FOR INTERNAL COMBUSTION ENGINE

(75) Inventors: Satoru Nosaka, Nagoya (JP); Kazuharu Tochikawa, Kariya (JP); Shigeto Yahata, Obu (JP)

(73) Assignee: Denso Corporation, Kariya (JP)

( * ) Notice: Subject to any disclaimer, the term of this patent is extended or adjusted under 35 U.S.C. 154(b) by 785 days.

(21) Appl. No.: 11/606,054

(22) Filed: Nov. 30, 2006

(65) Prior Publication Data

US 2007/0125076 A1    Jun. 7, 2007

(30) Foreign Application Priority Data

Dec. 6, 2005   (JP)   ............................. 2005-351868

(51) Int. Cl.
  *F01N 3/00*   (2006.01)
  *B01D 39/00*  (2006.01)
  *B01D 41/00*  (2006.01)
  *B01D 45/00*  (2006.01)
  *B01D 46/00*  (2006.01)
  *B01D 49/00*  (2006.01)
  *B01D 50/00*  (2006.01)
  *B01D 51/00*  (2006.01)
  *B01D 46/46*  (2006.01)

(52) U.S. Cl. .......................... 60/295; 60/297; 55/282.3; 95/20; 95/21

(58) Field of Classification Search .................. 60/295, 60/297; 95/20–21; 55/282.3
See application file for complete search history.

(56) References Cited

U.S. PATENT DOCUMENTS

| 6,966,178 B2 | 11/2005 | Saito et al. |
| 2003/0167757 A1 | 9/2003 | Boretto et al. |
| 2003/0230075 A1* | 12/2003 | Saito et al. ..................... 60/291 |
| 2004/0172933 A1* | 9/2004 | Saito et al. ..................... 60/277 |

OTHER PUBLICATIONS

Konstandopoulos, "Fundamental Studies of Diesel Particulate Filters: Transient Loading, Regeneration and Aging", SAE Paper No. 2000-01-1016, 2000, pp. 593-615.

German Office Action dated Oct. 16, 2009, issued in corresponding German Application No. 10 2006 035 488.5-3, with English translation.

* cited by examiner

*Primary Examiner*—Thomas E Denion
*Assistant Examiner*—Audrey Klasterka
(74) *Attorney, Agent, or Firm*—Nixon & Vanderhye PC

(57) ABSTRACT

An exhaust gas purifying apparatus for a diesel engine has a filter provided in an exhaust pipe of the engine for trapping diesel particulates contained in exhaust gas. The filter is regenerated when an accumulated amount of the diesel particulates exceeds a predetermined value. An electronic control unit estimates the accumulated amount of the diesel particulates from a pressure loss at the filter, based on an accumulation characteristic in which the pressure loss is related to the accumulated amount of the diesel particulates, and corrects the accumulation characteristic depending on flow velocity of the exhaust gas.

9 Claims, 7 Drawing Sheets

EXHAUST GAS PURIFYING APPARATUS FOR INTERNAL COMBUSTION ENGINE

CROSS REFERENCE TO RELATED APPLICATION

This application is based on Japanese Patent Application No. 2005-351868 filed on Dec. 6, 2005, the disclosure of which is incorporated herein by reference.

FIELD OF THE INVENTION

The present invention relates to an exhaust gas purifying apparatus for an internal combustion engine, which has a filter for trapping diesel particulates contained in exhaust gas from the internal combustion engine.

BACKGROUND OF THE INVENTION

In recent years, a filter for trapping diesel particulates is provided in an exhaust pipe of a diesel engine mounted in a vehicle, in order to reduce diesel particulates contained in the exhaust gas.

The filter is made of a porous ceramic body having multiple exhaust gas passages, so that the diesel particulates are trapped by the filter when the exhaust gas passes through porous partitioning walls, which define the multiple exhaust gas passages. A pressure loss is increased, as the trapped (accumulated) amount of the diesel particulates is increased. Then, an engine efficiency is decreased. Accordingly, the filter is re-generated by burning the trapped diesel particulates when the accumulated amount of the diesel particulates becomes larger than a predetermined amount.

According to Japanese Patent Publication No. 2004-286019, an accumulation characteristic is prepared, in which a relation between the accumulated amount of the diesel particulates and the pressure loss is defined. Then, the accumulated amount of the diesel particulates is presumed based on the pressure loss, and the filter is re-generated when the presumed accumulated amount of the diesel particulates exceeds a predetermined value.

According to a further investigation of the inventors, for example, in the apparatus of the above Japanese Patent Publication, the accumulated amount and/or density of the diesel particulates trapped in the partitioning walls will be varied depending on flow velocity of the exhaust gas passing through the partitioning walls. As a result, the accumulation characteristic for defining the relation between the accumulated amount of the diesel particulates and the pressure loss is changed. Namely, the presuming accuracy for the accumulated amount of the diesel particulates becomes worse.

SUMMARY OF THE INVENTION

The present invention is made in view of the foregoing problems, and has an object to provide an exhaust gas purifying apparatus for an internal combustion engine, according to which an accumulation characteristic is prepared, in which a relation between the accumulated amount of the diesel particulates and the pressure loss is defined, the accumulated amount of the diesel particulates is presumed based on the pressure loss at a filter for trapping the diesel particulates, and the presuming accuracy for the accumulated amount of the diesel particulates is improved.

According to one of features of the present invention, an exhaust gas purifying apparatus has a filter provided in an exhaust pipe of the engine and having multiple exhaust gas passages defined by porous partitioning walls, for trapping diesel particulates contained in exhaust gas from the engine by the porous partitioning walls when the exhaust gas passes through the porous partitioning walls, wherein the diesel particulates accumulated in the filter are forcibly combusted to re-generate the filter when an accumulated amount of the trapped diesel particulates exceeds a predetermined mount.

The exhaust gas purifying apparatus further has a means for estimating the accumulated amount of the diesel particulates from a pressure loss at the filter, based on an accumulation characteristic in which the pressure loss is related to the accumulated amount of the diesel particulates; a means for detecting a flow velocity of the exhaust gas passing through the porous partitioning walls; and a means for correcting the accumulation characteristic depending on the flow velocity of the exhaust gas detected by the flow velocity detecting means.

According to the above feature, the accumulation characteristic is corrected depending on the flow velocity of the exhaust gas, so that estimating accuracy for the accumulated amount of the diesel particulates is improved.

According to another feature of the invention, the accumulation characteristic has a first and a second characteristic lines for a first and second range, wherein the first range is a range from an initial point (at which the accumulated amount is zero) to a transition point, and the second range is a range above the transition point. An increasing ratio of the pressure loss with respect to an increase of the accumulated amount of the diesel particulates is constant in the first range, so that the pressure loss increases in proportion to the increase of the accumulated amount of the diesel particulates in the first range. And the pressure loss also increases in proportion to the increase of the accumulated amount of the diesel particulates in the second range, but in a slower manner than the pressure loss in the first range. The accumulation characteristic correcting means changes the transition point of the accumulation characteristic, in such a manner that the accumulated amount of the diesel particulates at the transition point is increased in accordance with an increase of the flow velocity of the exhaust gas in the first range.

The diesel particulates are likely to more deeply enter into the porous partitioning walls, as the flow velocity of the exhaust gas is increased. Accordingly, the amount of the diesel particulates accumulated in the partitioning walls is increased. According to the above feature, the accumulation characteristic is corrected in consideration of the amount of the diesel particulates accumulated in the partitioning walls, the estimating accuracy for the accumulated amount of the diesel particulates is improved.

According to a further feature of the invention, the increasing ratio of the pressure loss with respect to the increase of the accumulated amount of the diesel particulates is constant in the first range, so that the pressure loss increases in proportion to the increase of the accumulated amount of the diesel particulates in the first range. And the pressure loss also increases in proportion to the increase of the accumulated amount of the diesel particulates in the second range, but in a slower manner than the pressure loss in the first range. The accumulation characteristic correcting means changes the transition point of the accumulation characteristic, in such a manner that the pressure loss at the transition point is increased in accordance with the increase of the flow velocity of the exhaust gas in the first range.

A density of the diesel particulates accumulated in the partitioning walls becomes higher, as the flow velocity of the exhaust gas is increased. Accordingly, the pressure loss is increased in accordance with the increase of the flow velocity of the exhaust gas, even when the amount of the diesel particulates accumulated in the partitioning walls remains unchanged. According to the above feature, the accumulation characteristic is corrected in consideration of the density of the diesel particulates accumulated in the partitioning walls, the estimating accuracy for the accumulated amount of the diesel particulates is improved.

According to a still further feature of the invention, the increasing ratio of the pressure loss with respect to the increase of the accumulated amount of the diesel particulates is constant in the first range, so that the pressure loss increases in proportion to the increase of the accumulated amount of the diesel particulates in the first range. And the pressure loss also increases in proportion to the increase of the accumulated amount of the diesel particulates in the second range, but in a slower manner than the pressure loss in the first range. The accumulation characteristic correcting means changes the transition point of the accumulation characteristic, in such a manner that the accumulated amount of the diesel particulates as well as the pressure loss at the transition point is increased in accordance with the increase of the flow velocity of the exhaust gas in the first range.

According to the above feature, the accumulation characteristic is corrected in consideration of the amount and density of the diesel particulates accumulated in the partitioning walls, the estimating accuracy for the accumulated amount of the diesel particulates is improved.

According to a still further feature of the present invention, an exhaust gas purifying apparatus for a diesel engine has; a filter provided in an exhaust pipe of the engine and having multiple exhaust gas passages defined by porous partitioning walls, for trapping diesel particulates contained in exhaust gas from the engine by the porous partitioning walls when the exhaust gas passes through the porous partitioning walls; a pressure sensor for detecting pressure loss between an upstream and a downstream side of the filter; a device for detecting flow velocity of the exhaust gas flowing through the filter; and an electronic control unit for carrying out an operation of re-generation of the filter when an estimated amount for accumulated diesel particulates in the filter exceeds a predetermined mount.

The electronic control unit estimates the accumulated amount of the diesel particulates from a pressure loss at the filter, based on an accumulation characteristic in which the pressure loss is related to the accumulated amount of the diesel particulates, and the electronic control unit corrects the accumulation characteristic depending on the flow velocity of the exhaust gas detected by the flow velocity detecting means.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

A first embodiment of the present invention will be explained with reference to FIG. 1, which is a schematic view showing a whole structure of an internal combustion engine, to which an exhaust gas purifying apparatus according to a first embodiment of the present invention is applied.

Figure 1:
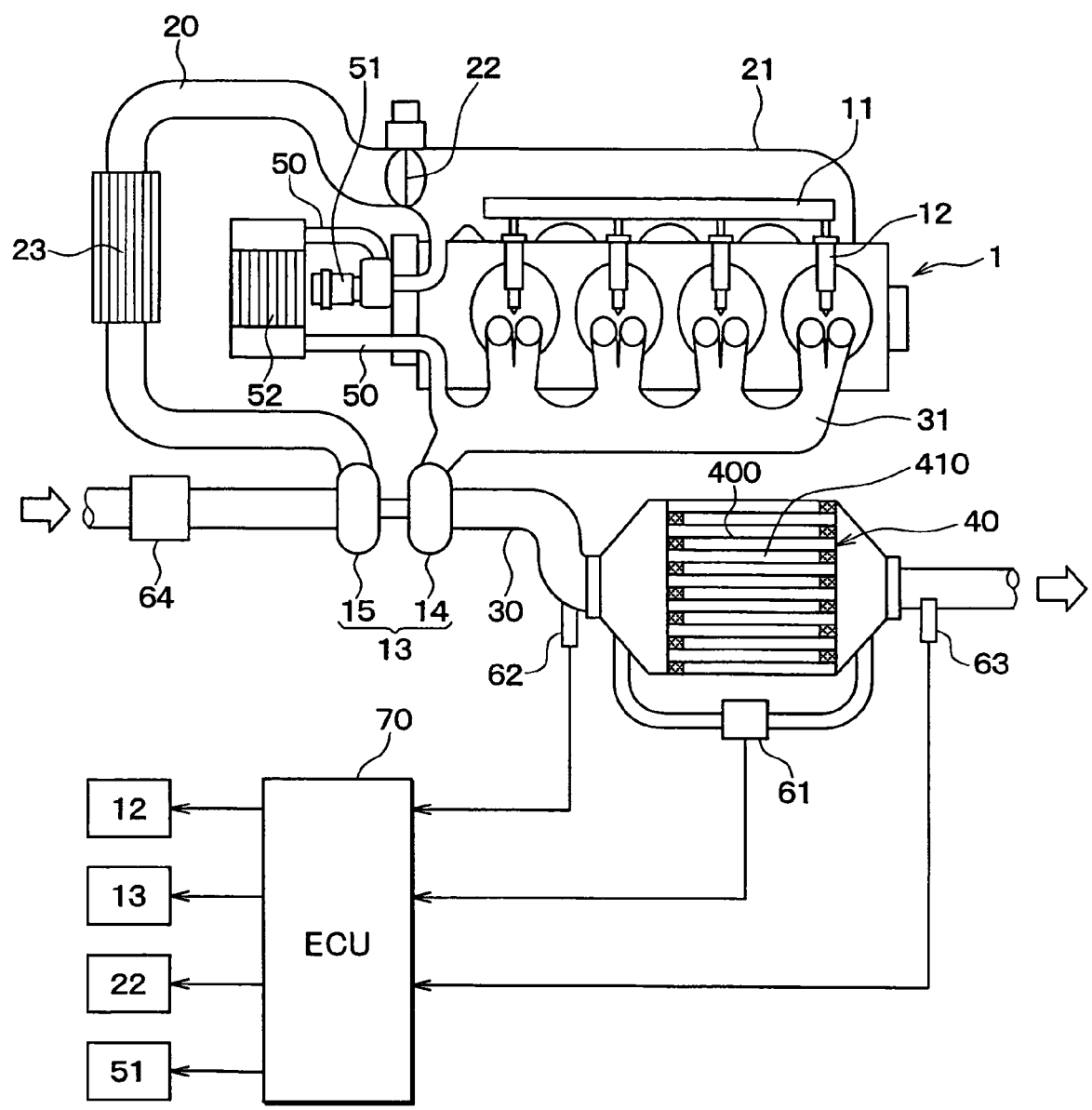
FIG. 1 is a schematic view showing a whole structure of an internal combustion engine, to which an exhaust gas purifying apparatus according to a first embodiment of the present invention is applied.

In FIG. 1, an internal combustion engine 1 is a water cool type diesel engine mounted in a vehicle, which is driven to run by the engine 1. The engine 1 has a common rail 11 for accumulating high pressure fuel, and multiple injectors 12 connected to the common rail 11 and injecting high pressure fuel into respective cylinders of the engine 1. A fuel pump (not shown), which is operated by the engine 1, pumps out pressurized fuel to the common rail 11.

An intake manifold 21 is connected to an intake pipe 20, and an intake throttle valve 22 is provided at a coupling portion, at which the intake manifold 21 is coupled to the intake pipe 20. An area of an intake air passage is adjusted by the throttle valve 22, to control intake air amount.

An exhaust manifold 31 is connected to an exhaust pipe 30, at which a filter 40 for trapping diesel particulates (hereinafter, also referred to as PM) contained in exhaust gas is provided.

The filter 40 is formed into a honeycomb shape made of heat-resisting ceramics, such as cordierite, in which multiple exhaust gas passages 410 are defined by porous partitioning walls 400, and inlet and outlet portions thereof are alternately closed. Oxidation catalyst is carried by the porous partitioning walls 400.

The exhaust gas from the engine 1 enters into the filter 40 from the exhaust gas passages 410, the inlet portions of which are not closed, and passes through the porous partitioning walls 400 to enter into the neighboring exhaust gas passages 410. The diesel particulates (PM) are trapped when the exhaust gas passes through the porous partitioning walls 400.

A turbine 14 of a centrifugal supercharger 13 is provided in the exhaust pipe 30 at an upstream side of the filter 40. The turbine 14 is connected to a compressor 15 via a turbine shaft, wherein the compressor 15 is provided in the intake pipe 20. The turbine 14 is driven by the thermal energy of the exhaust gas, so that the compressor 15 is operated via the turbine shaft to compress the intake air sucked into the intake pipe 20. A supercharging pressure of the centrifugal supercharger 13 is adjusted by changing an inclination of a nozzle (not shown) provided on a side of the compressor 15.

An intercooler 23 is provided in the intake pipe 20 at a downstream side of the compressor 15 but at an upstream side of the intake throttle valve 22, in order to cool the intake air which is compressed by the compressor 15 and increased in its temperature.

The exhaust manifold 31 is connected to the intake manifold 21 through an EGR passage 50, so that a part of the exhaust gas is re-circulated to the intake system through the EGR passage 50. An EGR valve 51 is provided at a coupling portion between the EGR passage 50 and the intake manifold 21, in order that an amount of the exhaust gas to be re-circulated to the intake system is controlled by adjusting an area of the EGR passage 50 by the EGR valve 51. An EGR cooler 52 is provided in the EGR passage 50 to cool the exhaust gas to be re-circulated to the intake system.

A pressure sensor 61 is provided in the exhaust pipe 30 to detect and output an electrical signal indicating a differential pressure at the filter 40, namely a pressure loss at the filter 40. The pressure sensor 61 is communicated at its one end to the exhaust pipe 30 at an upstream side of the filter 40, and at its other end to the exhaust pipe 30 at a downstream side of the filter 40.

A first temperature sensor 62 is provided in the exhaust pipe 30 at the upstream side of the filter 40 to detect and output an electrical signal indicating a temperature of the exhaust gas flowing into the filter 40. A second temperature sensor 63 is likewise provided in the exhaust pipe 30 at the downstream side of the filter 40 to detect and output an electrical signal indicating a temperature of the exhaust gas flowing out from the filter 40.

An air-flow meter 64 is provided in the intake pipe 20 at the upstream side of the compressor 15 to output an electrical signal depending on a mass flow rate per unit of time of the intake air.

The output (electrical) signals from the above sensors are inputted into an electronic control unit (ECU) 70, which is composed of a well-known micro computer having CPU, ROM, RAM, EEPROM and so on.

The ECU 70 carries out a process for calculating a PM accumulated amount (based on the differential pressure) in accordance with a program stored in the micro computer, wherein the pressure loss of the filter 40 detected by the pressure sensor 61 is used for the calculation.

The ECU 70 also carries out a process for calculating a PM accumulated amount (based on a record) in accordance with a program stored in the micro computer, wherein the calculation is made by use of a flow amount of the diesel particulates (PM) from the engine 1 to the filter 40 and a combustion amount of the diesel particulates (PM) combusted in the filter 40.

The ECU 70 further performs a process for a re-generation of the filter 40 in accordance with a program stored in the micro computer, wherein a timing for the re-generation of the filter 40 is calculated based on the PM accumulated amount.

Figure 2:
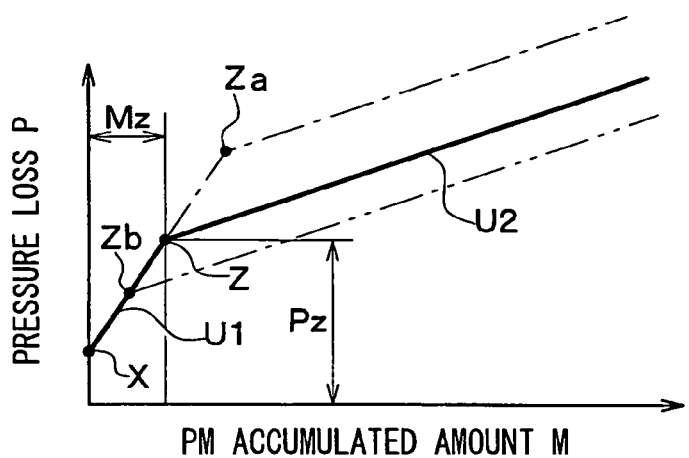
FIG. 2 is a graph showing a relation between a PM accumulated amount M and a pressure loss P.

A relation between the accumulated amount of the diesel particulates (PM) in the filter 40 and the pressure loss at the filter 40 will be explained. FIG. 2 shows an accumulation characteristic between the pressure loss P and the PM accumulated amount M (based on the differential pressure), wherein the pressure loss P is increased as the diesel particulates (PM) are accumulated in the filter 40, from the PM accumulated amount M is zero, at which the filter 40 is a brand-new or fully re-generated so that no diesel particulates (PM) are accumulated therein.

A characteristic line of the pressure loss P with respect to the PM accumulated amount M (based on the differential pressure) is indicated by two straight lines. A gradient of the straight line is changed, when the PM accumulated amount M (based on the differential pressure) reaches at a predetermined point Z (hereinafter, referred to as a transition point Z).

In a first range, in which the pressure loss P is changed from X (at which the PM accumulated amount M is zero) to the transition point Z, the pressure loss P is largely changed with respect to the increase of the PM accumulated amount M (based on the differential pressure), because the diesel particulates (PM) pass through the porous partitioning walls 400 and are trapped therein to partly plug the exhaust gas passages 410.

In a second range, which is above the transition point Z, the diesel particulates (PM) are accumulated on the surfaces of the partitioning walls 400 in a layered structure after the diesel particulates (PM) are trapped in the partitioning walls 400. Accordingly, the pressure loss P is slowly changed with respect to the increase of the PM accumulated amount M (based on the differential pressure). The increase of the pressure loss P in the second range is slower than that in the first range.

In FIG. 2, a solid line designates an accumulation characteristic (a standard accumulation characteristic), in a case that a flow velocity V of passing gas (exhaust gas) is at its standard flow velocity Vstd. A one-dot-chain line and a two-dot-chain line designate corrected accumulation characteristics with respect to the flow velocity V of the passing gas.

In the specification, the PM accumulated amount M (based on the differential pressure) at the transition point Z is referred to as a PM accumulated amount Mz (transition point Z). The pressure loss P at the transition point Z is referred to as a pressure loss Pz (transition point Z). The characteristic line in the first range between X and Z is referred to as a first characteristic line U1, whereas the characteristic line in the second range above the transition point Z is referred to as a second characteristic line U2.

Figure 3:
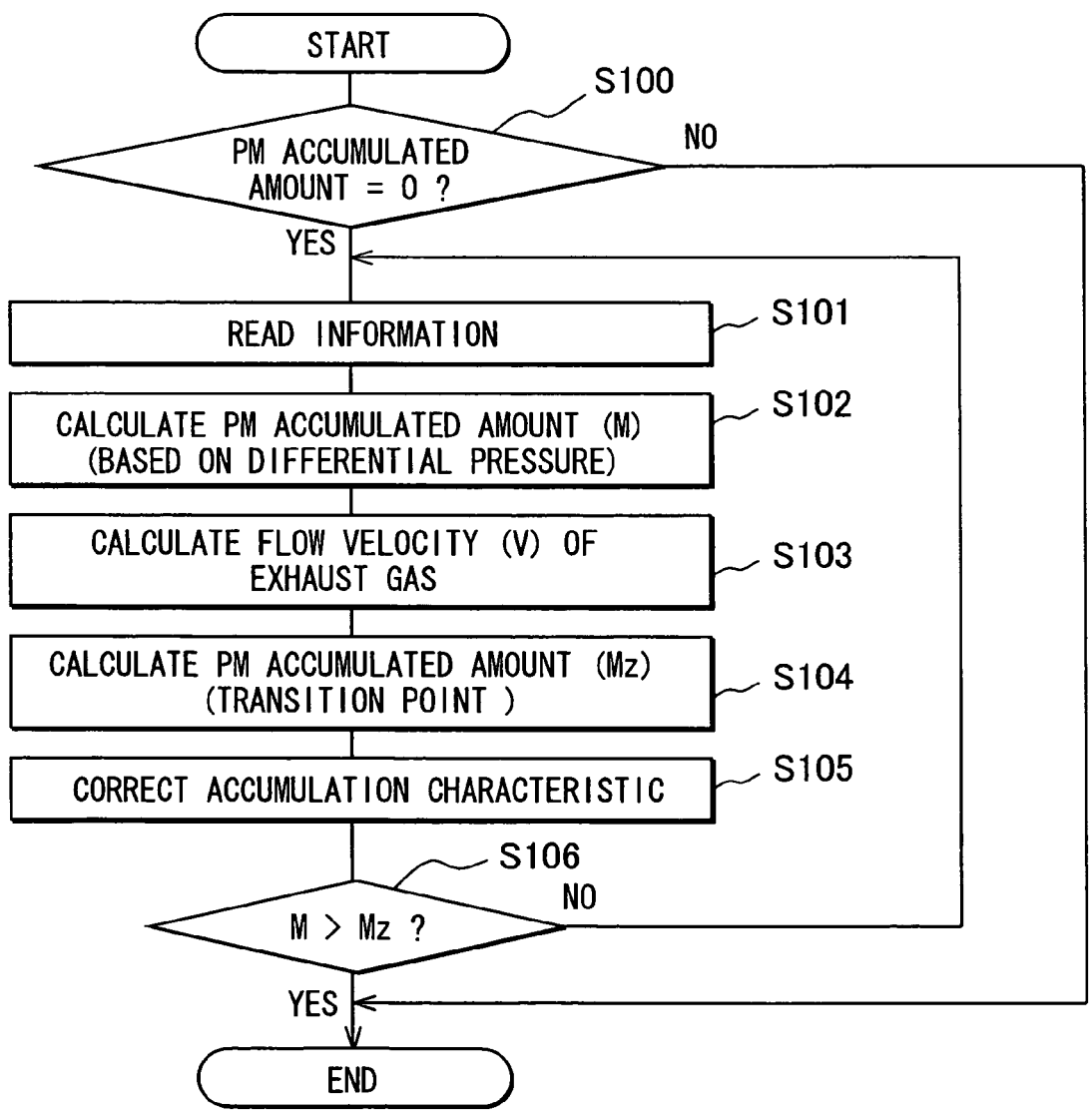
FIG. 3 is a flow chart showing a process performed by ECU for correcting accumulation characteristic.

An operation of the exhaust gas purifying apparatus according to the first embodiment will be explained. FIG. 3 is a flow chart showing a process carried out by the ECU 70 for correcting the accumulation characteristic, which is a part of the process for calculating the PM accumulated amount M (based on the differential pressure).

At a step S100, the ECU 70 determines whether the PM accumulated amount M (based on the differential pressure), which has been calculated by the ECU 70 in the process for calculating the PM accumulated amount M (based on the differential pressure), is zero or not. When the PM accumulated amount M becomes zero as a result of the re-generation operation for the filter 40, the ECU 70 determines as YES, and the process goes to a step S101.

At the above step S100, the PM accumulated amount (based on the record) may be used for the determination of the step S100, instead of the PM accumulated amount M (based on the differential pressure).

At the step S101, the ECU 70 reads information, such as the pressure loss P detected by the pressure sensor 61, the temperatures of the exhaust gas respectively detected by the first and second temperature sensors 62 and 63, the mass flow rate per unit of time of the intake air detected by the airflow meter 64, and so on.

At a step S102, the ECU 70 calculates the PM accumulated amount M (based on the differential pressure), based on the pressure loss P read in the step S101, in accordance with the latest first characteristic line U1 corrected at a step S105

(described below). The calculated PM accumulated amount M (based on the differential pressure) is stored in the EEPROM of the ECU 70.

At a step S103, the ECU 70 converts the mass flow rate per unit of time of the intake air (which is read in the step S101) into a volumetric flow rate per unit of time of the exhaust gas, based on the temperature of the exhaust gas and the pressure at the upstream side of the filter 40, both of which are also read in the step S101. Then, the ECU 70 calculates the flow velocity V of the exhaust gas passing through the partitioning walls 400, in which the converted volumetric flow rate is divided by a passage area of the partitioning walls 400.

An average amount of the temperatures detected by the first and second temperature sensors 62 and 63 may be used as the temperature of the exhaust gas in the above calculation. The pressure at the upstream side of the filter may be estimated from the pressure loss P for the filter 40 detected by the pressure sensor 61.

The flow velocity V of the exhaust gas, which is calculated at the step S103, is an average flow velocity during a period from the step S100 (a time point, at which the ECU 70 determined YES at the step S100) to the step S103. In particular, the flow velocity V of the exhaust gas, which is calculated at the step S103 shortly before the ECU 70 determines YES at a step S106 (described below), is an average flow velocity during a period corresponding to the first range from the initial point X to the transition point Z.

Figure 4:
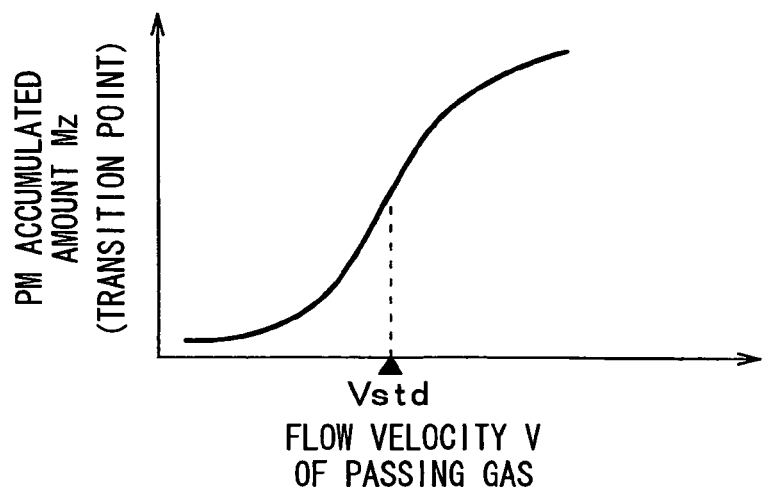
FIG. 4 is a graph showing a relation between a flow velocity V of passing gas and PM accumulated amount Mz at a transition point.

When the flow velocity V of the exhaust gas becomes higher, the diesel particulates (PM) are trapped more deeply in the partitioning walls 400 and the PM accumulated amount is thereby increased. Accordingly, it is preferable to change the PM accumulated amount Mz (transition point Z) depending on the flow velocity V of the exhaust gas. A map for a characteristic line of the PM accumulated amount Mz (transition point Z) with respect to the flow velocity V of the exhaust gas, as shown in FIG. 4, is stored in the ROM of the ECU 70. At a step S104, the ECU 70 obtains the PM accumulated amount Mz (transition point Z) from the flow velocity V of the exhaust gas calculated at the step S103, and based on the map. And at a step S105, the ECU 70 corrects the accumulation characteristic based on the PM accumulated amount Mz (transition point Z) obtained at the step S104.

More exactly, in the case that the flow velocity V of the exhaust gas calculated at the step S103 is higher than the standard flow velocity Vstd, the first characteristic line U1 is corrected such that the PM accumulated amount Mz (transition point Z) becomes larger, whereas the increasing ratio of the pressure loss P with respect to the increase of the PM accumulated amount M (based on the differential pressure) is not changed, as indicated by the one-dot-chain line in FIG. 2. As a result, a value of the pressure loss Pz (transition point Z) becomes higher than that of the standard accumulation characteristic.

The transition point Z is moved to a point Za, in accordance with the correction of the first characteristic line U1. The second characteristic line U2 is also moved to the line indicated by the one-dot-chain line, so that the second characteristic line U2 starts from the new (corrected) transition point Za. As above, the second characteristic line U2 is also corrected such that the increasing ratio of the pressure loss P with respect to the increase of the PM accumulated amount M (based on the differential pressure) is not changed, but moved in a parallel shift manner.

The above corrected accumulation characteristic is stored in the EEPROM of the ECU 70, whereas the standard accumulation characteristic is stored in the ROM of the ECU 70.

In the case that the flow velocity V of the exhaust gas calculated at the step S103 is lower than the standard flow velocity Vstd, the first characteristic line U1 is corrected such that the PM accumulated amount Mz (transition point Z) becomes smaller, whereas the increasing ratio of the pressure loss P with respect to the increase of the PM accumulated amount M (based on the differential pressure) is not changed, as indicated by the two-dot-chain line in FIG. 2. As a result, a value of the pressure loss Pz (transition point Z) becomes smaller than that of the standard accumulation characteristic. The transition point is moved from Z to Zb.

At a step S106, the ECU 70 compares the PM accumulated amount M (based on the differential pressure) calculated at the step S102 with the PM accumulated amount Mz (transition point Z) calculated at the step S104. The ECU 70 determines NO at the step S106, when the amount M is smaller than the amount Mz, and then the steps S101 to S105 are repeated, to continue the correction of the accumulation characteristic. During the above process in which the steps S101 to S105 are repeated, the other process, namely the other process than the process of FIG. 3, is carried out.

The PM accumulated amount will be increased as a result of the continuous operation of the engine 1. The ECU 70 determines YES at the step S106, when the PM accumulated amount M (based on the differential pressure) calculated at the step S102 becomes higher than the PM accumulated amount Mz (transition point Z) calculated at the step S104. Then, the process for correcting the accumulation characteristic ends.

In the case that the ECU 70 determines YES at the step S106, the accumulation characteristic is no longer corrected until the ECU 70 determines YES at the step S100 next time. During such a period, for example, the process for re-generating the filter is carried.

As above, the corrected accumulation characteristic is used at the step S102, at which the ECU 70 calculates the PM accumulated amount M (based on the differential pressure) based on the pressure loss P of the filter 40. The process for re-generating the filter 40 is carried out, when the PM accumulated amount M (based on the differential pressure) or the PM accumulated amount (based on the record) becomes higher than a predetermined threshold value for the re-generating operation. During the re-generating operation, the accumulated diesel particulates (PM) are removed by combusting them.

As described above, the accumulated amount of the diesel particulates trapped and accumulated in the partitioning walls 400 is changed depending on the flow velocity V of the exhaust gas, during the first range (i.e. until the transition point Z). Namely, the accumulation characteristic is changed depending on the flow velocity V of the exhaust gas. According to the above embodiment, however, the accumulation characteristic is corrected depending on the flow velocity V of the exhaust gas, so that the estimating accuracy for the PM accumulated amount M (based on the differential pressure) can be improved.

The step S102 corresponds to a means for estimating the accumulated amount, the step S103 corresponds to a means for detecting the flow velocity. The steps S104 and S105 correspond to a means for correcting the accumulation characteristic.

Second Embodiment

A second embodiment will be explained. According to the first embodiment, an attention is focused on the fact that the accumulated amount of the diesel particulates (PM) trapped and accumulated in the partitioning walls 400 changes depending on the flow velocity V of the exhaust gas, during the first range (i.e. until the transition point Z), and the PM accumulated amount Mz (transition point Z) is changed in accordance with the flow velocity V of the exhaust gas. According to the second embodiment, however, an attention is paid to the fact that the density of the accumulated diesel particulates (PM) trapped and accumulated in the partitioning walls 400 changes depending on the flow velocity V of the exhaust gas, during the first range. And therefore, the pressure loss Pz (transition point Z) is changed in accordance with the flow velocity V of the exhaust gas.

Figure 5:
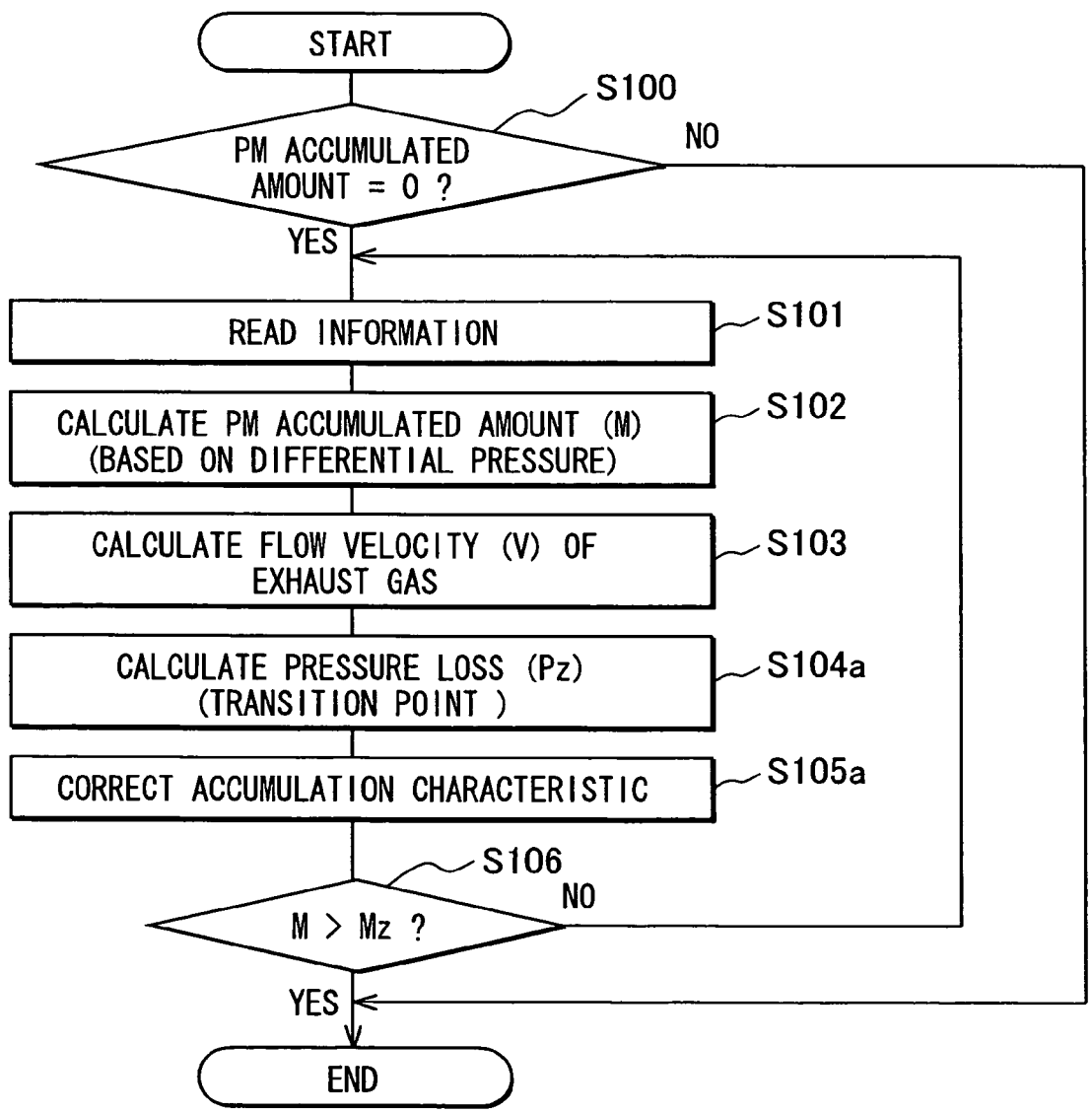
FIG. 5 is a flow chart showing a process performed by ECU for correcting accumulation characteristic, according to a second embodiment.

FIG. 5 is a flow chart showing a process for correcting accumulation characteristic to be performed by ECU of an exhaust gas purifying apparatus of the second embodiment. The same reference numerals designate the same or similar parts or portions to the first embodiment.

Figure 6:
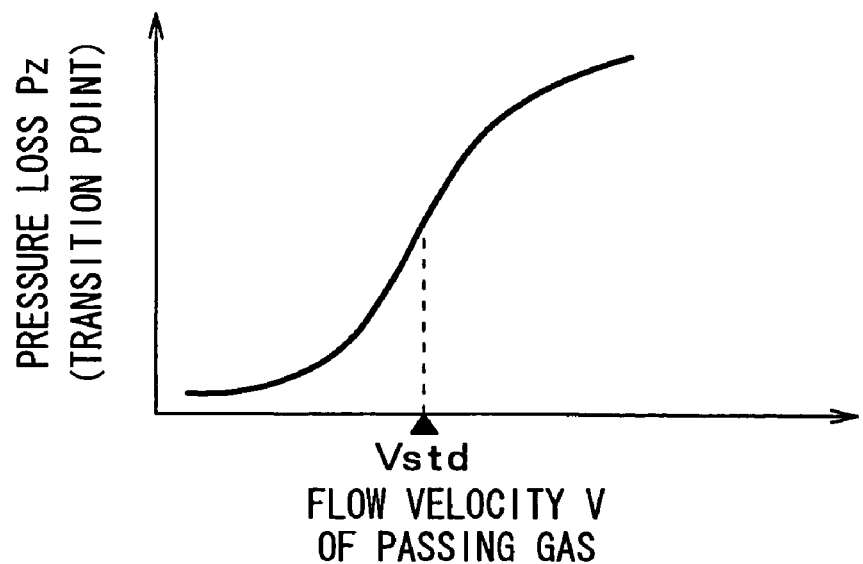
FIG. 6 is a graph showing a relation between a flow velocity V of passing gas and a pressure loss Pz at a transition point.

At a step S104a of FIG. 5, the ECU 70 obtains the pressure loss Pz (transition point Z) from the flow velocity V of the exhaust gas calculated at the step S103. More exactly, a map for a characteristic line of the pressure loss Pz (transition point Z) with respect to the flow velocity V of the exhaust gas, as shown in FIG. 6, is stored in the ROM of the ECU 70 (as shown in FIG. 1). Accordingly, at the step S104a, the pressure loss Pz (transition point Z) is obtained from the map based on the flow velocity V of the exhaust gas calculated at the step S103.

Figure 7:
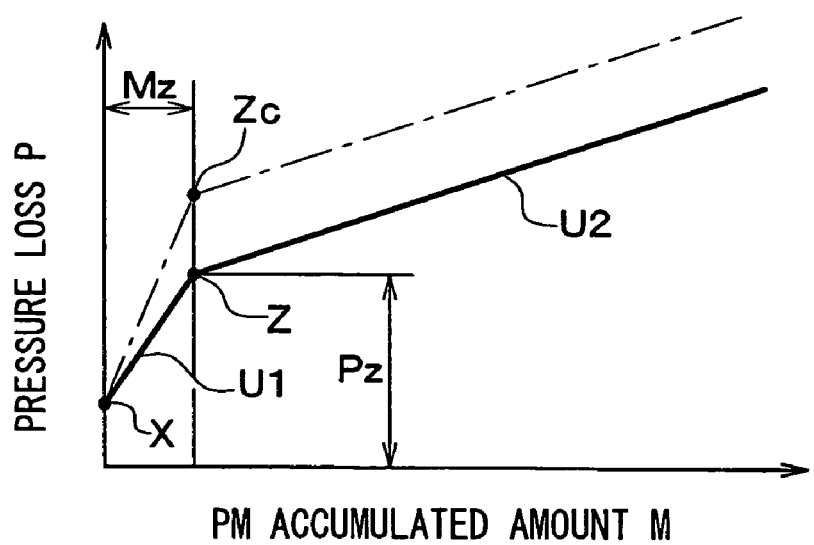
FIG. 7 is a graph showing a relation between a PM accumulated amount M and a pressure loss P, according to the second embodiment.

At a step S105a, the ECU 70 corrects the accumulation characteristic based on the pressure loss Pz (transition point Z) obtained at the step S104a. FIG. 7 shows an accumulation characteristic between the pressure loss P and the PM accumulated amount M (based on the differential pressure), wherein a solid line indicates a standard accumulation characteristic, and a one-dot-chain line indicates a corrected accumulation characteristic corrected in accordance with the flow velocity V of the exhaust gas. A process for correcting the accumulation characteristic at the step S105a will be explained with reference to FIG. 7.

At the step S105a, in the case that the flow velocity V of the exhaust gas calculated at the step S103 is higher than the standard flow velocity Vstd, the first characteristic line U1 is corrected such that the pressure loss Pz (transition point Z) becomes higher than the pressure loss P, whereas the PM accumulated amount Mz (transition point Z) is not changed, as indicated by the one-dot-chain line in FIG. 7. As a result, the increasing ratio of the pressure loss P with respect to the increase of the PM accumulated amount M (based on the differential pressure) becomes larger than that of the standard accumulation characteristic.

The transition point Z is moved to a point Zc, in accordance with the correction of the first characteristic line U1. The second characteristic line U2 is also moved to the line indicated by the one-dot-chain line, so that the second characteristic line U2 starts from the new (corrected) transition point Zc. As above, the second characteristic line U2 is corrected such that the increasing ratio of the pressure loss P with respect to the increase of the PM accumulated amount M (based on the differential pressure) is not changed, but moved in a parallel shift manner. The above corrected accumulation characteristic is stored in the EEPROM of the ECU 70.

In the case that the flow velocity V of the exhaust gas calculated at the step S103 is lower than the standard flow velocity Vstd, the first characteristic line U1 is corrected such that the pressure loss Pz (transition point Z) becomes lower than the pressure loss P, whereas the PM accumulated amount Mz (transition point Z) is not changed. As a result, the increasing ratio of the pressure loss P with respect to the increase of the PM accumulated amount M (based on the differential pressure) becomes smaller than that of the standard accumulation characteristic.

According to the second embodiment, the accumulation characteristic is appropriately corrected depending on the flow velocity V of the exhaust gas, as a result of considering that the density of the accumulated diesel particulates (PM) trapped and accumulated in the partitioning walls changes depending on the flow velocity V of the exhaust gas, during the first range. The estimating accuracy for the PM accumulated amount M (based on the differential pressure) is thereby improved.

The steps S104a and S105a correspond to a means for correcting the accumulation characteristic.

Third Embodiment

A third embodiment will be explained. According to the first embodiment, as already explained, the attention is focused on the fact that the accumulated amount of the diesel particulates (PM) trapped and accumulated in the partitioning walls 400 changes depending on the flow velocity V of the exhaust gas, during the first range (i.e. until the transition point Z), and the PM accumulated amount Mz (transition point Z) is changed in accordance with the flow velocity V of the exhaust gas. On the other hand, according to the second embodiment, however, the attention is paid to the fact that the density of the accumulated diesel particulates (PM) trapped and accumulated in the partitioning walls 400 changes depending on the flow velocity V of the exhaust gas, during the first range. And therefore, the pressure loss Pz (transition point Z) is changed in accordance with the flow velocity V of the exhaust gas. According to the third embodiment, the PM accumulated amount Mz (transition point Z) as well as the pressure loss Pz (transition point Z) is changed in accordance with the flow velocity V of the exhaust gas.

Figure 8:
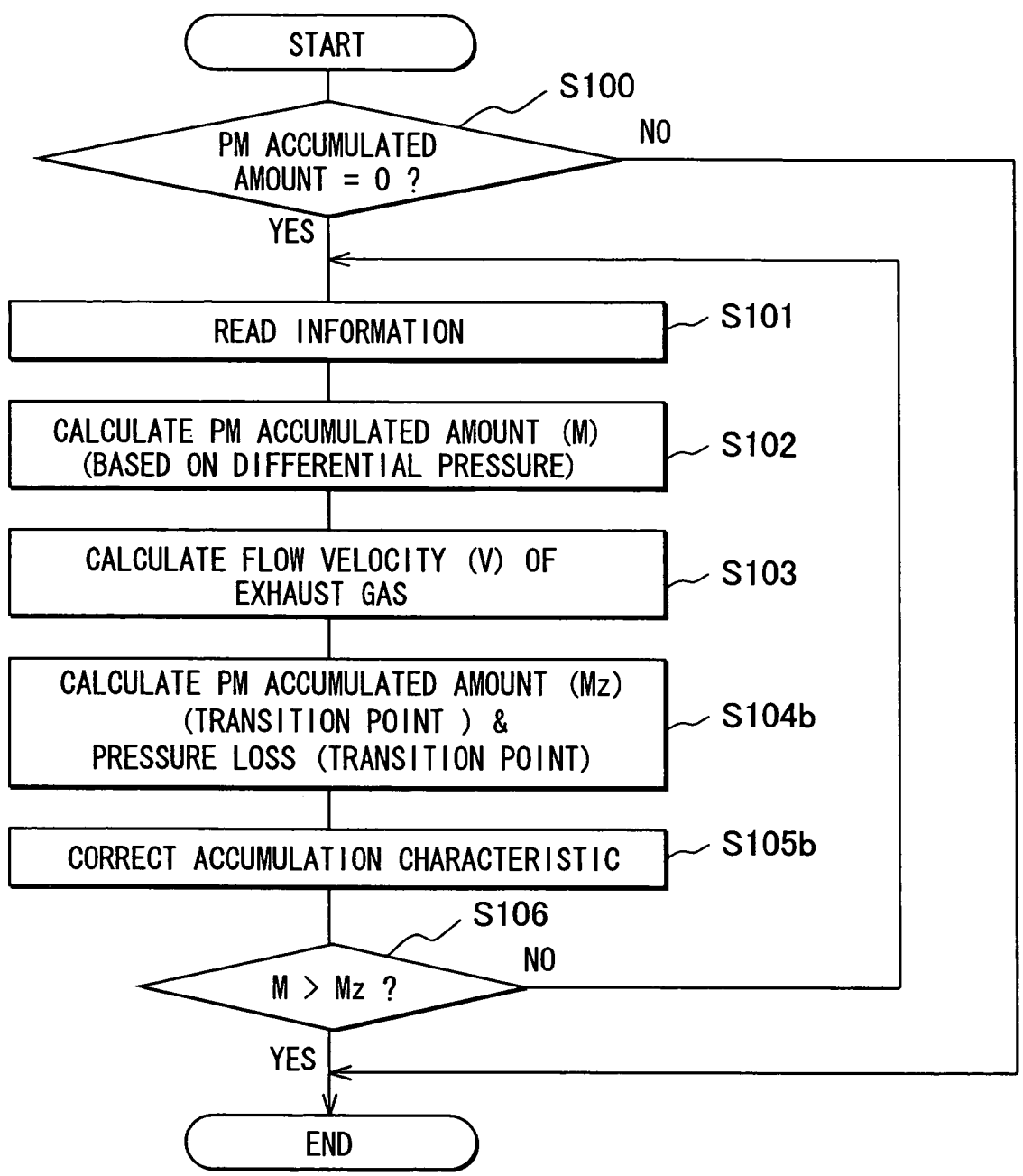
FIG. 8 is a flow chart showing a process performed by ECU for correcting accumulation characteristic, according to a third embodiment.

FIG. 8 is a flow chart showing a process for correcting accumulation characteristic to be performed by ECU of an exhaust gas purifying apparatus of the third embodiment. The same reference numerals designate the same or similar parts or portions to the first embodiment.

At a step S104b of FIG. 8, the ECU 70 obtains the PM accumulated amount Mz (transition point Z) from the flow velocity V of the exhaust gas calculated at the step S103, based on the map shown in FIG. 4, and also obtains the pressure loss Pz (transition point Z) from the flow velocity V of the exhaust gas calculated at the step S103, based on the map shown in FIG. 6.

At a step S105b, the ECU 70 corrects the accumulation characteristic based on the PM accumulated amount Mz (transition point Z) and the pressure loss Pz (transition point Z) obtained at the step S104b.

Figure 9:
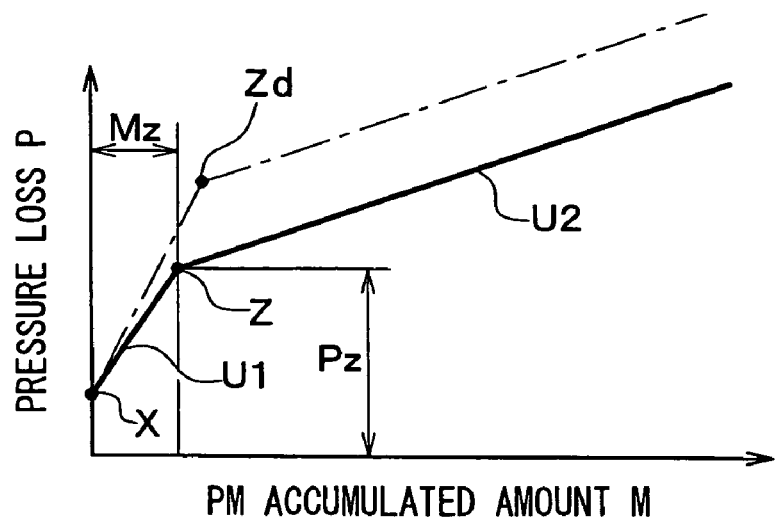
FIG. 9 is a graph showing a relation between a PM accumulated amount M and a pressure loss P, according to the third embodiment.

FIG. 9 shows an accumulation characteristic between the pressure loss P and the PM accumulated amount M (based on the differential pressure), wherein a solid line indicates a standard accumulation characteristic, and a one-dot-chain line indicates a corrected accumulation characteristic corrected in accordance with the flow velocity V of the exhaust gas. A process for correcting the accumulation characteristic at the step S105b will be explained with reference to FIG. 9.

At the step S105b, in the case that the flow velocity V of the exhaust gas calculated at the step S103 is higher than the standard flow velocity Vstd, the first characteristic line U1 is corrected such that the PM accumulated amount Mz (transition point Z) becomes larger than that of the standard characteristic line U1, and also the pressure loss Pz (transition point Z) becomes higher than that of the standard characteristic line U1, as indicated by the one-dot-chain line in FIG. 9. As a result, the increasing ratio of the pressure loss P with respect to the increase of the PM accumulated amount M (based on the differential pressure) becomes larger than that of the standard accumulation characteristic.

The transition point Z is moved to a point Zd, in accordance with the correction of the first characteristic line U1. The second characteristic line U2 is also moved to the line indicated by the one-dot-chain line, so that the second characteristic line U2 starts from the new (corrected) transition point Zd. As above, the second characteristic line U2 is corrected such that the increasing ratio of the pressure loss P with respect to the increase of the PM accumulated amount M (based on the differential pressure) is not changed, but moved in a parallel shift manner. The above corrected accumulation characteristic is stored in the EEPROM of the ECU 70.

In the case that the flow velocity V of the exhaust gas calculated at the step S103 is lower than the standard flow velocity Vstd, the first characteristic line U1 is corrected such that the PM accumulated amount Mz (transition point Z) becomes smaller than that of the standard characteristic line U1, and also the pressure loss Pz (transition point Z) becomes lower than that of the standard characteristic line U1. As a result, the increasing ratio of the pressure loss P with respect to the increase of the PM accumulated amount M (based on the differential pressure) becomes smaller than that of the standard accumulation characteristic.

According to the third embodiment, the accumulation characteristic is appropriately corrected depending on the flow velocity V of the exhaust gas, as a result of considering that the amount and density of the accumulated diesel particulates (PM) trapped and accumulated in the partitioning walls changes depending on the flow velocity V of the exhaust gas, during the first range. The estimating accuracy for the PM accumulated amount M (based on the differential pressure) is thereby improved.

The steps S104b and S105b correspond to a means for correcting the accumulation characteristic.

Fourth Embodiment

A fourth embodiment will be explained. According to the fourth embodiment, the step for obtaining the PM accumulated amount Mz (transition point Z) is different from that of the first embodiment.

Figure 10:
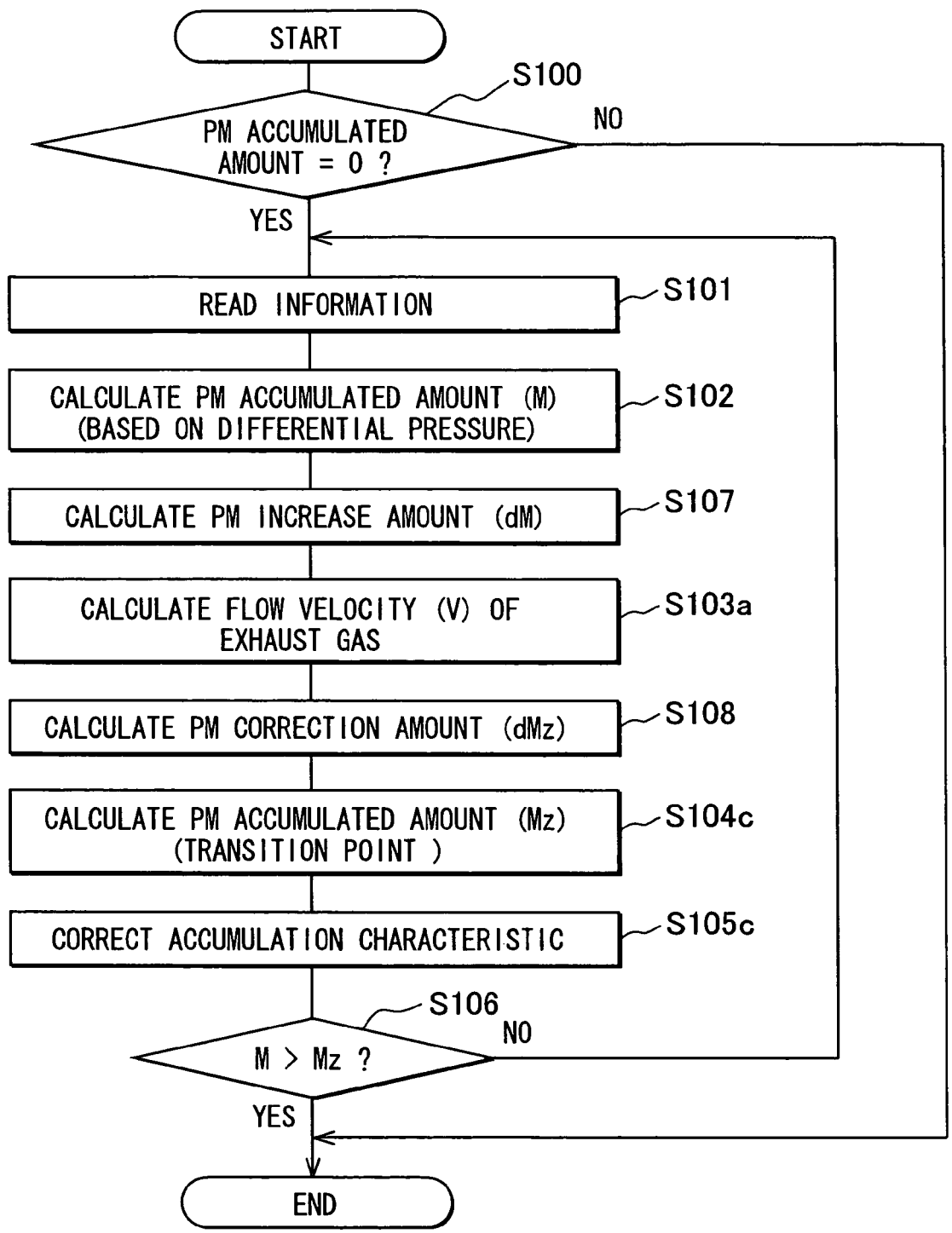
FIG. 10 is a flow chart showing a process performed by ECU for correcting accumulation characteristic, according to a fourth embodiment.

FIG. 10 is a flow chart showing a process for correcting accumulation characteristic to be performed by ECU of an exhaust gas purifying apparatus of the fourth embodiment. When the PM accumulated amount M becomes zero as a result of the re-generation operation for the filter 40, the ECU 70 determines YES at the step S100, and the process goes to the step S101 at which the ECU 70 reads various information.

At the step S102, the ECU 70 calculates the PM accumulated amount M (based on the differential pressure), based on the pressure loss P read in the step S101, in accordance with the latest first characteristic line U1 corrected at a step S105c (described below). The calculated PM accumulated amount M (based on the differential pressure) is stored in the EEPROM of the ECU 70.

Then, at a step S107, the ECU 70 calculates an increased amount dM of the PM accumulated amount M (based on the differential pressure). Hereinafter, the amount dM is also referred to as a PM increased amount dM. More exactly, since the PM increased amount dM is a difference between a current PM accumulated amount and a previous PM accumulated amount, the PM increased amount dM is calculated by subtracting the previous PM accumulated amount from the current PM accumulated amount.

At the step S103a, the ECU 70 calculates the flow velocity V of the exhaust gas passing through the partitioning walls 400, as in the same manner to the step S103 of the first embodiment. The flow velocity V of the exhaust gas, which is calculated at the step S103a, is an average flow velocity during a period from a previous time point (at which the flow velocity is calculated at a previous step) to a current time point (at which the flow velocity is calculated at this time).

At a step 108, the ECU 70 calculates a correction amount dMz (transition point Z) per unit volume of the accumulated diesel particulates. The correction amount dMz (transition point Z) per unit volume is used as an amount, by which the PM accumulated amount Mz (transition point Z) is changed to an increasing or a decreasing side of the PM accumulated amount M.

A corrected amount of this time for the PM accumulated amount M is calculated by a multiplication of the correction amount dMz (transition point Z) per unit volume and the PM increased amount dM calculated at the step S107.

Figure 11:
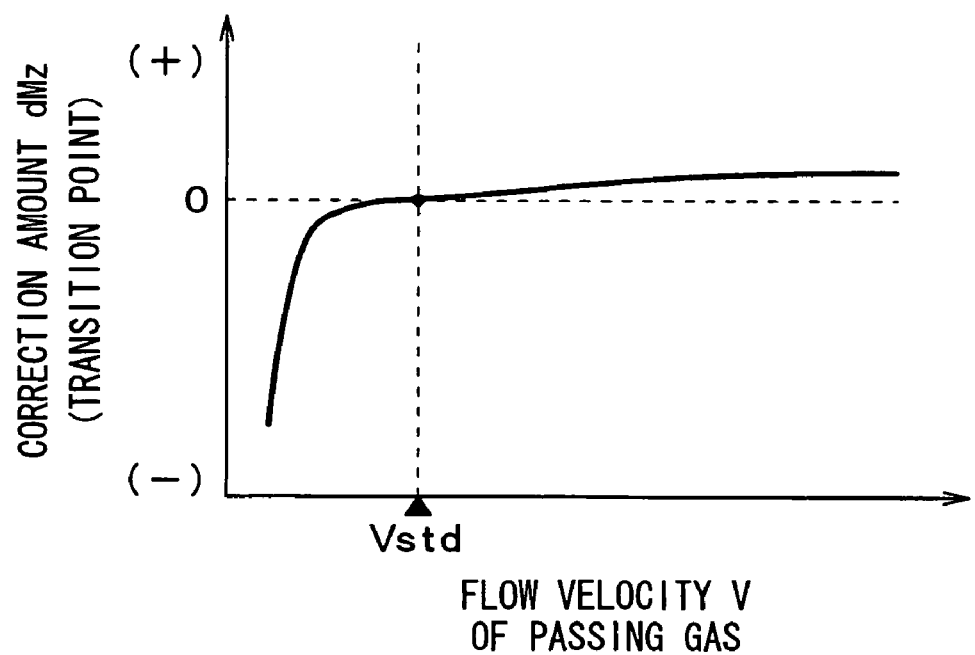
FIG. 11 is a graph showing a relation between a flow velocity V of passing gas and a correction amount dMz (transition point).

FIG. 11 is a map showing a relation between the correction amount dMz (transition point Z) per unit volume and the flow velocity V of the exhaust gas, which is stored in the ROM of the ECU 70. As shown in FIG. 11, the correction amount dMz (transition point Z) per unit volume is zero, when the flow velocity V of the exhaust gas is equal to the standard flow velocity Vstd.

The correction amount dMz (transition point Z) per unit volume becomes a negative value, when the flow velocity V of the exhaust gas is lower than the standard flow velocity Vstd. The absolute figure for the correction amount dMz (transition point Z) per unit volume becomes larger, as the flow velocity V of the exhaust gas is lower. On the other hand, the correction amount dMz (transition point Z) per unit volume becomes a positive value, when the flow velocity V of the exhaust gas is higher than the standard flow velocity Vstd. The figure for the correction amount dMz (transition point Z) per unit volume becomes larger, as the flow velocity V of the exhaust gas is higher.

At a step S104c, the PM accumulated amount Mz (transition point Z) is calculated in the following formula:

$$Mz = Mzold + dMz \times dM$$

The PM accumulated amount Mzold (transition point Z) of the previous time is equal to the PM accumulated amount Mz (transition point Z) of the standard accumulation characteristic, in the case that the PM accumulated amount Mz (transition point Z) is calculated for the first time after the determination of YES at the step S100. The PM accumulated amount Mzold (transition point Z) of the previous time is equal to the PM accumulated amount Mz (transition point Z) of the previous time, when the PM accumulated amount Mz (transition point Z) is calculated after the second time after the determination of YES at the step S100.

Accordingly, the PM accumulated amount Mz (transition point Z), which is repeatedly calculated by the above formula until the determination of NO at a step S106, is a value, which is obtained by adding the correction amount (=dMz×dM) for the PM accumulated amount Mz (transition point Z) to the PM accumulated amount Mz (transition point Z) of the standard accumulation characteristic.

At a step S105c, the ECU 70 corrects the accumulation characteristic, based on the PM accumulated amount Mz (transition point Z) calculated at the step S104c. A process for correcting the accumulation characteristic at the step S105c will be explained with reference to FIG. 2.

At the step S105c, in the case that the PM accumulated amount Mz (transition point Z) calculated at the step S104c is larger than the PM accumulated amount Mz (transition point Z) of the standard accumulation characteristic, namely when the integrated value of the correction amount for the PM accumulated amount Mz (transition point Z) is positive, the first characteristic line U1 is corrected, as indicated by the one-dot-chain line in FIG. 2, such that the PM accumulated amount Mz (transition point Z) becomes larger than that of the standard accumulation characteristic, whereas the increasing ratio of the pressure loss P with respect to the increase of the PM accumulated amount M (based on the differential pressure) is not changed. As a result, a value of the pressure loss Pz (transition point Z) becomes higher than that of the standard accumulation characteristic.

The transition point Z is moved to a point Za, in accordance with the correction of the first characteristic line U1. The second characteristic line U2 is also moved to the line indicated by the one-dot-chain line, so that the second characteristic line U2 starts from the new (corrected) transition point Za. As above, the second characteristic line U2 is corrected such that the increasing ratio of the pressure loss P with respect to the increase of the PM accumulated amount M (based on the differential pressure) is not changed, but moved in a parallel shift manner. The above corrected accumulation characteristic is stored in the EEPROM of the ECU 70.

In the case that the PM accumulated amount. MZ (transition point Z) calculated at the step S104c is smaller than the PM accumulated amount Mz (transition point Z) of the standard accumulation characteristic, namely when the integrated value of the correction amount for the PM accumulated amount Mz (transition point Z) is negative, the first characteristic line U1 is corrected, as indicated by the two-dot-chain line in FIG. 2, such that the increasing ratio of the pressure loss P with respect to the increase of the PM accumulated amount M (based on the differential pressure) is not changed, whereas the PM accumulated amount Mz (transition point Z) becomes smaller than that of the standard accumulation characteristic. As a result, the pressure loss Pz (transition point Z) becomes smaller than that of the standard accumulation characteristic.

The step S103a corresponds to a detecting means for detecting the flow velocity of the exhaust gas. The steps S108, S104c and S105c correspond to a means for correcting the accumulation characteristic.

In the above first to fourth embodiments, the PM accumulated amount M (based on the record) may be used at the step S102, instead of the PM accumulated amount M (based on the differential pressure).

What is claimed is:

1. An exhaust gas purifying apparatus for an internal combustion engine comprising:
   a filter provided in an exhaust pipe of the engine and having multiple exhaust gas passages defined by porous partitioning walls, for trapping diesel particulates contained in exhaust gas from the engine by the porous partitioning walls when the exhaust gas passes through the porous partitioning walls, wherein the diesel particulates accumulated in the filter are forcibly combusted to re-generate the filter when an accumulated amount of the trapped diesel particulates exceeds a predetermined amount;
   a means for estimating the accumulated amount of the diesel particulates from a pressure loss at the filter, based on an accumulation characteristic in which the pressure loss is related to the accumulated amount of the diesel particulates;
   a means for detecting a flow velocity of the exhaust gas passing through the porous partitioning walls; and
   a means for correcting the accumulation characteristic depending on the flow velocity of the exhaust gas detected by the flow velocity detecting means, wherein
   the accumulation characteristic has a first characteristic line in a first range, in which the accumulated amount of the diesel particulates changes from a zero point to a transition point, and a second characteristic line in a second range, in which the accumulated amount of the diesel particulates changes from the transition point to a further larger amount,
   an increasing ratio of the pressure loss with respect to an increase of the accumulated amount of the diesel particulates is constant in the first range, so that the pressure loss increases in proportion to the increase of the accumulated amount of the diesel particulates in the first range,
   the pressure loss also increases in proportion to the increase of the accumulated amount of the diesel particulates in the second range, but in a slower manner than the pressure loss in the first range, and
   the accumulation characteristic correcting means corrects the accumulation characteristic in accordance with the first characteristic line, when the flow velocity of the exhaust gas detected by the flow velocity detecting means is in the first range.

2. An exhaust gas purifying apparatus according to claim 1, wherein
   the accumulation characteristic correcting means changes the transition point of the accumulation characteristic, in such a manner that the accumulated amount of the diesel particulates at the transition point is changed depending on the flow velocity of the exhaust gas in the first range, while the increasing ratio of the pressure loss with respect to the increase of the accumulated amount of the diesel particulates is maintained at a constant value.

3. An exhaust gas purifying apparatus according to claim 2, wherein
   the accumulation characteristic correcting means changes the transition point of the accumulation characteristic, in such a manner that the accumulated amount of the diesel particulates at the transition point is increased in accordance with an increase of the flow velocity of the exhaust gas in the first range.

4. An exhaust gas purifying apparatus according to claim 1, wherein
   the accumulation characteristic correcting means changes the transition point of the accumulation characteristic, in such a manner that the pressure loss at the transition point is changed depending on the flow velocity of the exhaust gas in the first range, while the accumulated amount of the diesel particulates at the transition point is maintained at a constant value.

5. An exhaust gas purifying apparatus according to claim 4, wherein
   the accumulation characteristic correcting means changes the transition point of the accumulation characteristic, in such a manner that the pressure loss at the transition point is increased in accordance with an increase of the flow velocity of the exhaust gas in the first range.

6. An exhaust gas purifying apparatus according to claim 1, wherein
   the accumulation characteristic correcting means changes the transition point of the accumulation characteristic, in such a manner that the accumulated amount of the diesel particulates as well as the pressure loss at the transition point is changed depending on the flow velocity of the exhaust gas in the first range.

7. An exhaust gas purifying apparatus according to claim 6, wherein
the accumulation characteristic correcting means changes the transition point of the accumulation characteristic, in such a manner that the accumulated amount of the diesel particulates as well as the pressure loss at the transition point is increased in accordance with an increase of the flow velocity of the exhaust gas in the first range.

8. An exhaust gas purifying apparatus according to claim 1, wherein
the flow velocity of the exhaust gas in the first range is an average flow velocity during a period of the first range.

9. An exhaust gas purifying apparatus according to claim 1, wherein
the flow velocity detecting means detects the flow velocity of the exhaust gas for multiple times,
the accumulation characteristic correcting means calculates a correction amount for the transition point based on the detected flow velocity of the exhaust gas in the first range, each time when the flow velocity of the exhaust gas in the first range is detected by the flow velocity detecting means, and
the accumulation characteristic correcting means corrects the accumulation characteristic based on an integrated value of the correction amount.

* * * * *